United States Patent
Dinh et al.

(10) Patent No.: US 10,572,319 B2
(45) Date of Patent: Feb. 25, 2020

(54) OPTIMIZATION OF MESSAGE ORIENTED MIDDLEWARE MONITORING IN HETEROGENENOUS COMPUTING ENVIRONMENTS

(71) Applicant: Dell Products L. P., Round Rock, TX (US)

(72) Inventors: Hung The Dinh, Austin, TX (US); Abhijit Mishra, Bangalore (IN); Satish Ranjan Das, Round Rock, TX (US); Vinod Kumar, Bangalore (IN); Mohammed Imran V, Bangalore (IN); Vineet Kumar, Shamli (IN); Vijaya Sekhar P, Bangalore (IN); Vinay Sathyanarayana, Bangalore (IN)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 15/803,164

(22) Filed: Nov. 3, 2017

(65) Prior Publication Data

US 2019/0138375 A1    May 9, 2019

(51) Int. Cl.
   *G06F 9/54*       (2006.01)
   *G06F 17/18*      (2006.01)
(52) U.S. Cl.
   CPC .............. *G06F 9/546* (2013.01); *G06F 9/542* (2013.01); *G06F 17/18* (2013.01)
(58) Field of Classification Search
   CPC ........... G06F 9/546; G06F 9/542; G06F 17/18
   See application file for complete search history.

(56) References Cited

U.S. PATENT DOCUMENTS

| | | | |
|---|---|---|---|
| 7,350,212 B2 | 3/2008 | Lambert et al. | |
| 7,856,461 B2 | 12/2010 | Venkatesan et al. | |
| 8,510,473 B1 | 8/2013 | Leonard | |
| 10,356,222 B2 | 7/2019 | Ghosh et al. | |
| 2002/0087507 A1* | 7/2002 | Hopewell | G06F 9/546 |
| 2003/0225876 A1* | 12/2003 | Oliver | H04L 41/22 709/224 |
| 2005/0055439 A1* | 3/2005 | Piccirilli | H04L 43/062 709/224 |
| 2008/0222255 A1* | 9/2008 | Hall | G06F 9/546 709/206 |

(Continued)

OTHER PUBLICATIONS

Dinh, Hung et al., U.S. Appl. No. 16/179,386, filed Nov. 2, 2018, entitled "Message Queue Architectures Framework Converter"; consisting of Specification, Claims, Abstract, and Drawings; 33 pages.

(Continued)

*Primary Examiner* — Charles E Anya
(74) *Attorney, Agent, or Firm* — Campbell Stephenson LLP; Shiv S. Naimpally

(57) ABSTRACT

Disclosed herein are methods, systems, and processes to optimize message oriented middleware monitoring in heterogeneous computing environments. A message queue managed by a message queue manager for applications executing on a first computing system that is part of multiple heterogeneous computing systems is accessed. Data associated with message queues managed by the message queue manager for the applications is received from the first computing system. An output file that includes the data is generated.

17 Claims, 12 Drawing Sheets

(56) References Cited

U.S. PATENT DOCUMENTS

| | | | | |
|---|---|---|---|---|
| 2010/0115041 | A1* | 5/2010 | Hawkins | G06Q 10/107 709/206 |
| 2014/0229480 | A1* | 8/2014 | Buxbaum | G06F 17/30572 707/736 |
| 2015/0310401 | A1* | 10/2015 | Siracusa | G06Q 20/4016 705/39 |
| 2015/0381709 | A1* | 12/2015 | Word | H04L 49/90 709/203 |
| 2016/0182328 | A1* | 6/2016 | Bhasin | H04L 43/067 709/224 |
| 2017/0180220 | A1* | 6/2017 | Leckey | H04L 41/12 |
| 2018/0314407 | A1 | 11/2018 | Dinh et al. | |
| 2018/0324118 | A1 | 11/2018 | Dinh et al. | |
| 2018/0365308 | A1* | 12/2018 | Kondo | G06F 16/245 |

OTHER PUBLICATIONS

Fikry, Sally et al., "Integrate IBM Integration Bus with your Messaging Solution Using the Connector Framework", Published on Nov. 23, 2017; 15 pages.

Hashimoto, Mitchell, "HashiCorp Terraform", Jul. 28, 2014; 5 pages.

Ho, Andy, U.S. Patent and Trademark Office, Non-Final Office Action dated Oct. 3, 2019 for U.S. Appl. No. 16/179,386 20 pages.

* cited by examiner

OPTIMIZATION OF MESSAGE ORIENTED MIDDLEWARE MONITORING IN HETEROGENENOUS COMPUTING ENVIRONMENTS

BACKGROUND OF THE DISCLOSURE

This disclosure relates to message oriented middleware monitoring. In particular, this disclosure relates to optimization of message oriented middleware monitoring in heterogeneous computing environments.

DESCRIPTION OF THE RELATED ART

Businesses, companies, and/or organizations rely on managing and processing critical data for their enterprise. Complex computing systems process, compile, and/or communicate information or data for business, personal, or other purposes, thus allowing users and businesses to realize the value of data. Typically, technology and information handling and managing needs and requirements vary between different applications implemented in an enterprise computing environment. The variations in managing and handling such data requires general configuration or specific configuration of applications and associated computing systems.

For example, a financial institution and an electronic commerce retailer may have different information management and handling requirements based on their users and customers. In some instances, multiple different management and handling configurations may be required within the same computing ecosystem. Therefore, such complex computing systems may include a variety of hardware and software components that may be configured to process, store, and communicate data using one or more computer systems, data storage systems, and networking systems.

Computing systems may be configured to provide a message queue system that allows applications executing on computing devices to communicate with each other. A message queue system utilizes a message oriented middleware (MOM) including a software and/or hardware infrastructure that supports the sending and receiving of messages between disparate distributed computing systems. A typical message oriented middleware monitor (MOMM) provides message queue managers that manage message queues storing messages received from sender applications on computing devices until receiver applications on other computing devices retrieve those messages for processing.

To process messages, an application needs to interface with message oriented middleware (also referred to as a message queue service) via message queue application programming interfaces (APIs) that use message queue service API libraries. Unfortunately, existing MOMMs are significantly limited in their operability based on the underlying computing system on which they are implemented. For example, a given MOMM may only be implemented on a computing system that runs on a specific operating system (OS) and may not be able to be implemented on another computing system that runs on a different OS. For modern businesses that implement disparate distributed computing systems, such a limitation presents a significant challenge in terms of computing and human resources necessary to monitor such heterogeneous computing systems. What's more, the processing and memory footprint of existing MOMMs is prohibitively computing resource expensive because of excessive script and output file generation, as well as ineffective API utilization.

SUMMARY OF THE DISCLOSURE

Disclosed herein are methods, systems, and processes to optimize message oriented middleware monitoring in heterogeneous computing environments. One such method involves accessing, by a computing device, a message queue managed by a message queue manager for applications executing on a first computing system that is part of multiple heterogeneous computing systems. The method receives, from the first computing system, data associated with message queues managed by the message queue manager for the applications, and generates an output file that includes the data.

In one embodiment, the accessing, the receiving, and the generating are caused by executing, at the computing device or at the first computing system, a single instance Application Programming Interface (API) command that causes the execution of commands in a set of APIs in the first computing system.

In another embodiment, generating the output file includes accessing, at the computing device or the first computing system, a configuration file that includes information identifying a root directory of a data object that corresponds to the message queue manager, accessing the root directory, parsing sibling data objects of the data object, retrieving the data associated with the message queues, and storing the data in a multi-dimensional array.

In some embodiments, the retrieved data includes message queue statistics information, channel statistics information, and queue manager statistics information that include middleware monitoring data associated with the applications. In this example, the middleware monitoring data indicates a value assigned to each message queue.

In other embodiments, the method involves executing, at the computing device or at a second computing system of the multiple heterogeneous computing systems, the single instance API that causes execution of commands in the set of APIs in the second computing system. In this example, the second computing system has a different operating system and implements a different message oriented middleware monitor than the first computing system, and is communicatively coupled to the computing device and the first computing system via a network.

In certain embodiments, the message queue manager permits monitoring of disparate middleware management services implemented by the heterogeneous computing systems using the single instance API, and the output file is generated in a Comma Separated Values (CSV) file format or in a tabular data file format.

The foregoing is a summary and thus contains, by necessity, simplifications, generalizations and omissions of detail; consequently those skilled in the art will appreciate that the summary is illustrative only and is not intended to be in any way limiting. Other aspects, features, and advantages of the present disclosure, as defined solely by the claims, will become apparent in the non-limiting detailed description set forth below.

BRIEF DESCRIPTION OF THE DRAWINGS

The present disclosure may be better understood, and its numerous objects, features and advantages made apparent to those skilled in the art by referencing the accompanying drawings.

Figure 1A:
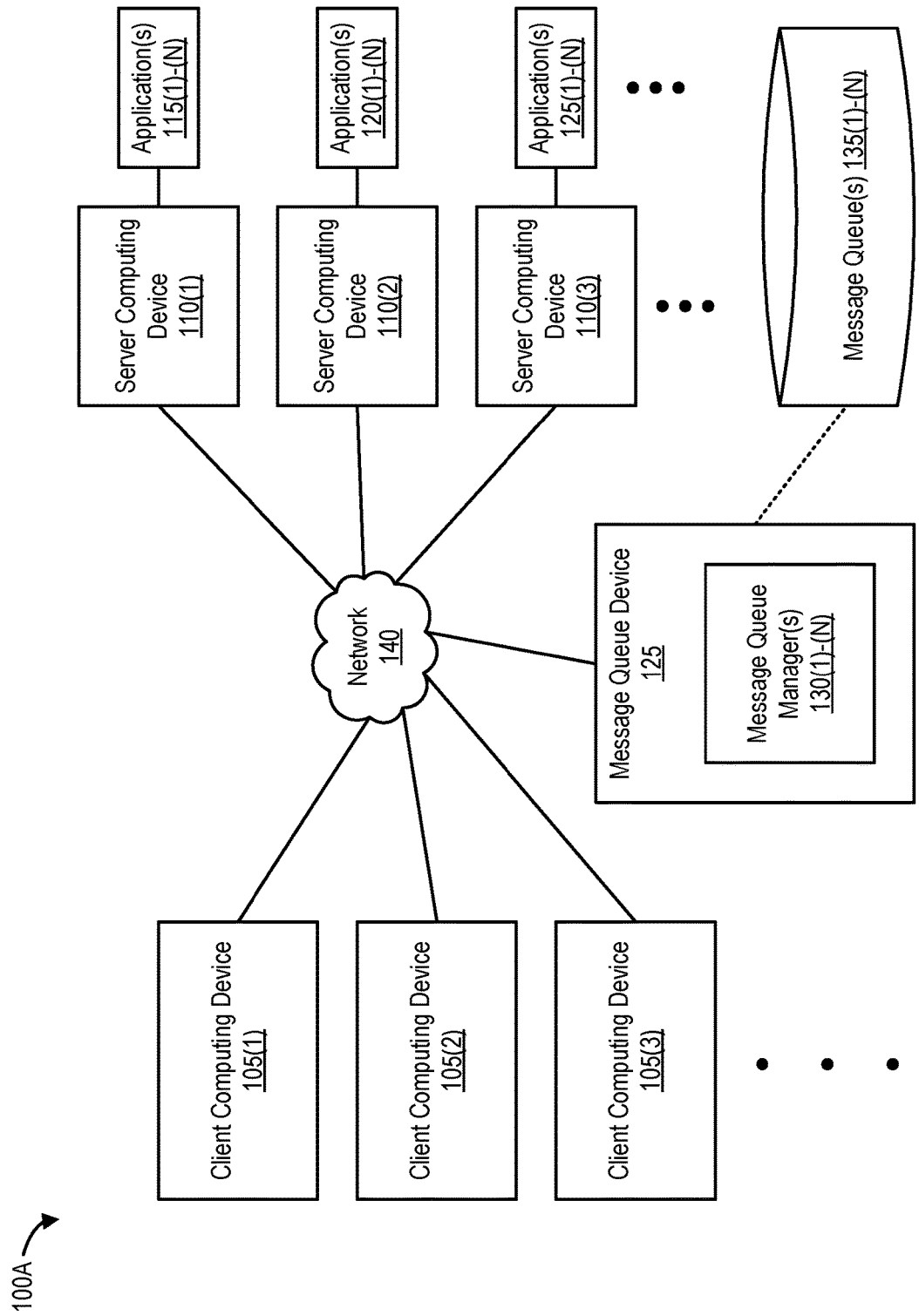
FIG. 1A is a block diagram 100A of a message oriented middleware monitoring (MOMM) computing system, according to one embodiment of the present disclosure.

While the disclosure is susceptible to various modifications and alternative forms, specific embodiments of the disclosure are provided as examples in the drawings and detailed description. It should be understood that the drawings and detailed description are not intended to limit the disclosure to the particular form disclosed. Instead, the intention is to cover all modifications, equivalents and alternatives falling within the spirit and scope of the disclosure as defined by the appended claims.

DETAILED DESCRIPTION

Introduction

A message queue computing infrastructure enables applications and computer programs to communicate with each other across a network of unlike components (processors, operating systems (OSs), subsystems, communication protocols, and the like) using an application programming interface (API). Applications communicate by sending each other data in messages rather than calling each other directly. Messages are placed on queues in storage, allowing applications to run independently on each other, at different speeds and times, in different locations, and without having a logical connection between them.

Queuing is a mechanism by which messages are held until an application is ready to process the messages. Queueing permits communication between applications (which might be running in different computing environments) without having to write communication code, selection of the order in which an application processes messages, balancing loads on a computing system by arranging for more than one program to service a queue (e.g., when the number of messages exceeds a threshold), and increasing the availability of applications by arranging for an alternate computing system to service queues (e.g., if a primary computing system is unavailable or fails).

A message queue (MQ) is a named destination to which messages can be sent. Messages accumulate on queues until they are retrieved by programs that service those queues. MQs reside in, and are managed by, a queue manager. Unfortunately, the physical nature of a queue depends on the operating system on which the queue manager is running. A MQ can either be a volatile buffer area in the memory of a computing device, or data stored on a storage device (e.g., a disk). The management and handling of MQs is the responsibility of the queue manager and is not made apparent to the participating application programs (or simply, applications).

Applications can access MQs through the services of the queue manager (also called message queue service). Applications can open a MQ, put messages on the MQ, get messages from the MQ, and close the MQ. Applications can also set and access attributes of a given MQ.

In modern computing environments, disparate computing systems are used co-extensively to service a variety of applications and programs. For example, a typical message queue infrastructure implemented by an electronic commerce retailer can manage and handle order management, order fulfillment, manufacture, shipment, and support. Each of these various business-oriented functions can be implemented, managed, and handled by different and disparate computing systems that are heterogeneous in nature (e.g., different OSs, different hardware/software components, different message broker programs, and the like). For example, a computing system implementing order management services for a company can run on the Windows operating system and may manage and handle 8 queue managers, 14 applications, 86 integrations, and 1 million messages per day. In another example, a computing system implementing order fulfillment services for the company can run on the Linux operating system and may manage and handle 20 queue managers, 55 applications, 500+ integrations, and 16 million messages per day.

Therefore, modern businesses in application-oriented computing environments use MQ infrastructure to process millions of messages per day and to screen the heath of MQ systems by monitoring and alerting (e.g., using a MOMM computing system). Because of the disparate nature of modern business-oriented computing environments, companies typically deploy one or more monitoring tools that are specifically configured for a given computing system. Unfortunately, because the operability of such monitoring tools is limited by the software and/or hardware characteristics of a given computing system, such monitoring tools may not be able to be deployed on a different computing system in the same computing environment. In addition, existing middleware monitors present significant limitations with respect to financial cost and computing resource usage, at least for the following reasons.

First, with respect to financial costs, because existing middle monitors are limited by the software and/or hardware characteristics of a given computing system, a given company may have to purchase a license per MQ agent, a license per desktop tool, a license per server for other agents (e.g., OSs, file systems, and the like), and a license for web based graphical user interfaces (GUIs). In addition, each MQ agent may require customization, enhancements, and/or upgrades, making customization cost and resource prohibitive.

Second, with respect to the ease and efficiency of implementation and execution, existing middleware monitors experience frequent incidents of processing and memory spikes, cause problems with user management, are unable to monitor channels, use outdated web technologies (e.g., Java applet based), require thick clients to be deployed on end user systems, present problems with respect to web interfaces requiring out of support versions of Java (e.g., to run applets, which are difficult to maintain), place additional load(s) on computing resources because of separate agents running on servers, and require a proprietary architecture and programming model.

Third, with respect to script and output file generation and API utilization, existing middleware monitors require a separate script for each MQ (resulting in more scripts and output files per queue manager and a significant increase in executing and editing time for a server), produce a separate output file for each MQ (results in redundant data (e.g., because of header repetition for other MQs) that is presented in tabular format and is difficult to parse), cause a significant increase in processing and memory utilization (e.g., because of multiple instances of the monitoring tool), and make the same API calls for multiple MQs (causes a significant load increase on a MOMM computing system and associated servers).

Disclosed herein are methods, systems, and processes to optimize message oriented middleware monitoring in heterogeneous computing environments by at least reducing load(s) on servers, supporting agentless development, using Windows authentication (AD), not requiring local authentication, monitoring multiple MQs, a queue manager, and MQ channels, using industry standard web technologies, not requiring thick clients by providing a web client that can be accessed from any location, providing an open source architecture and programming model, providing predictive analysis and alerting, providing for capacity planning during peak periods, being independent of backend MQ vendors, and monitoring heterogeneous MQ computing environments.

It will be appreciated that the methods, systems, and processes disclosed herein are independent of backend MQ vendors and also provide monitoring of heterogeneous MQ computing environments.

Examples of Heterogeneous Message Queue Oriented Middleware Monitoring Systems

FIG. 1A is a block diagram 100A of a message oriented middleware monitoring (MOMM) computing system, according to one embodiment. As shown in FIG. 1A, client computing devices 105(1)-(3), server computing devices 110(1)-(3), and a message queue device 125 are communicatively coupled to each other via network 140. Client computing devices 105(1)-(3), server computing devices 110(1)-(3), and message queue device 125 can each be any of a variety of different types of computing devices, including a server, personal computing device, laptop computer, net book, personal digital assistant, cellular phone, or the like. Network 140 can be a local area network (LAN), a Wide Area Network (WAN, a Storage Area Network (SAN), the Internet, and the like, (or any other appropriate network and/or interconnection).

Server computing devices 110(1)-(3) execute applications 115(1)-(N), 120(1)-(N), and 125(1)-(N), respectively. Applications 115(1)-(N), 120(1)-(N), and 125(1)-(N) generate one or more messages that are placed on message queues 135(1)-(N). Message queue device 125 implements message queue managers 130(1)-(N). One or more of message queue managers 130(1)-(N) can manage and handle one or more message queues 135(1)-(N).

Figure 1B:
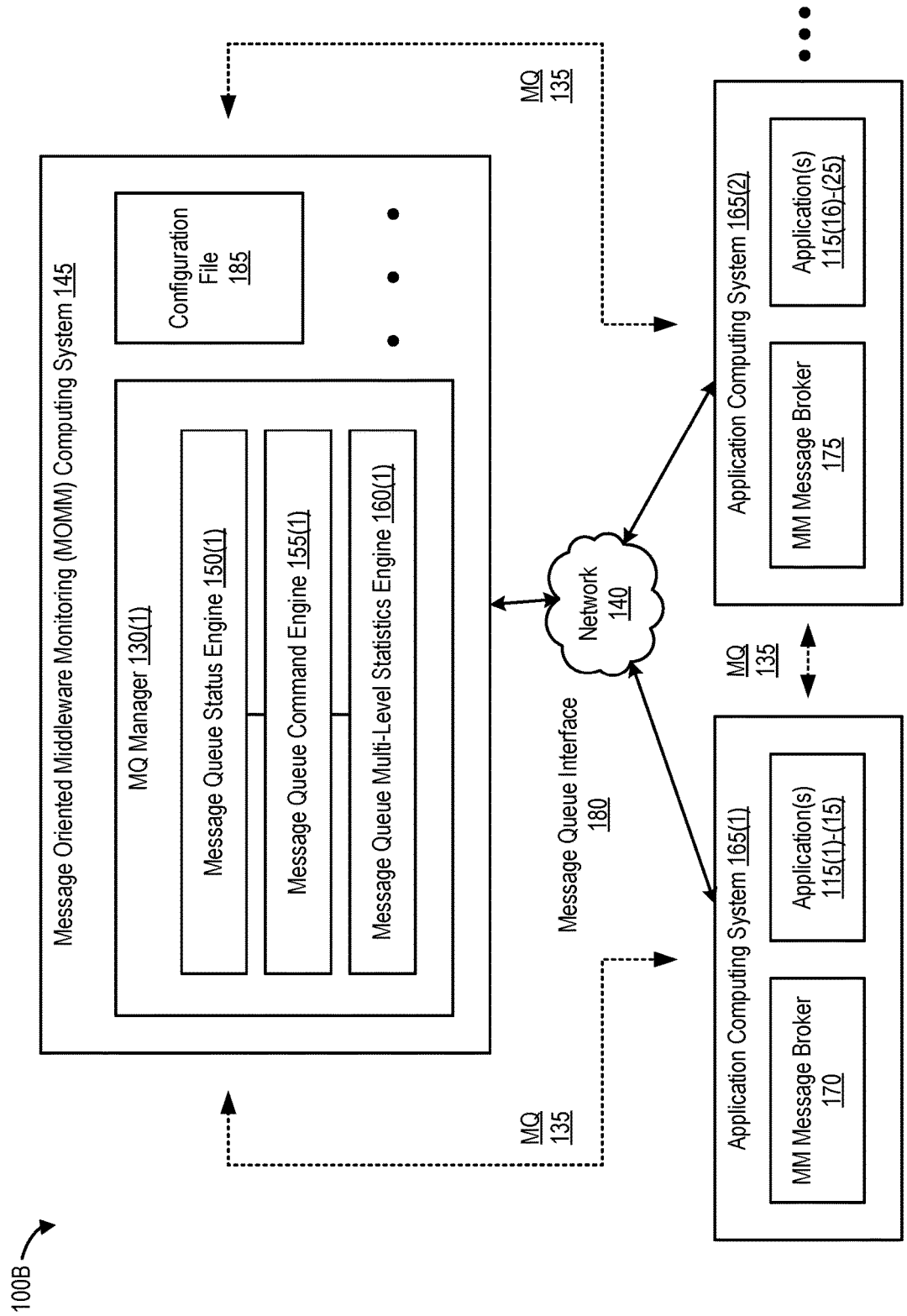
FIG. 1B is a block diagram 100B of a MOMM computing system and application computing systems, according to one embodiment of the present disclosure.

FIG. 1B is a block diagram 100B of a MOMM computing system and application computing systems, according to one embodiment. Message Oriented Middle Monitoring (MOMM) computing system 145 includes a MQ manager 130(1) and a configuration file 185. Configuration file 185 identifies MQ manager 130(1) (e.g., the root directory of MQ manager 130(1)). MQ manager 130(1) also implements at least a message queue status engine 150(1), a message queue command engine 155(1), and a message queue multi-level statistics engine 160(1). MQ status engine 150(1) retrieves the status of one or more MQs associated with one or more applications (e.g., MQ 135 as shown in FIG. 1B). MQ command engine 155(1) MQ multi-level statistics engine 160(1), either alone or in conjunction, provide a single instance API for collecting MQ data (e.g., messages associated with and/or generated by applications 115(1)-(15) and 115(16)-(25)) as well as MQ statistical data (e.g., queue statistics information, channel statistics information, queue manager statistics information, and the like). MQ manager 130(1) also provides a message queue interface 180 for application computing systems.

Application computing system 165(1) executes applications 115(1)-(15) as well as middleware monitoring (MM) message broker 170. Similarly, application computing system 165(2) executes applications 115(16)-(25) as well as MM message broker 175. MM message brokers 170 and 175 are disparate message brokers and provide MQ services to application computing systems 165(1) and 165(2), respectively. In one example, MM broker 170 may be an IBM® WebSphere 7.5 messaging queue service, an IBM® MQ 8.0 messaging queue service, an IBM® 9.0 messaging queue service, and/or other message oriented middleware services and/or versions. In another example, MM broker 175 may be a RabbitMQ® messaging queue service, a StormMQ® messaging queue service, an Apache® ActiveMQ messaging queue service, a Java® Message Service (JMS) messaging queue service, a Microsoft® Message Queuing (MSMQ) messaging queue service, and/or other message oriented middleware services and/or versions.

As previously noted, in existing middleware monitoring computing environments, different computing systems (e.g., application computing systems 165(1) and 165(2)) use different message oriented middleware managers (e.g., MM brokers 170 and 175, respectively). Because of limitations related to software and/or hardware characteristics of each application computing system, each MM broker can only monitor one MQ manager—a significant limitation to say the least, particularly in heterogeneous MOMM computing environments as shown in FIG. 1B (e.g., with respect to application computing systems 165(1) and 165(2)).

Figure 2A:
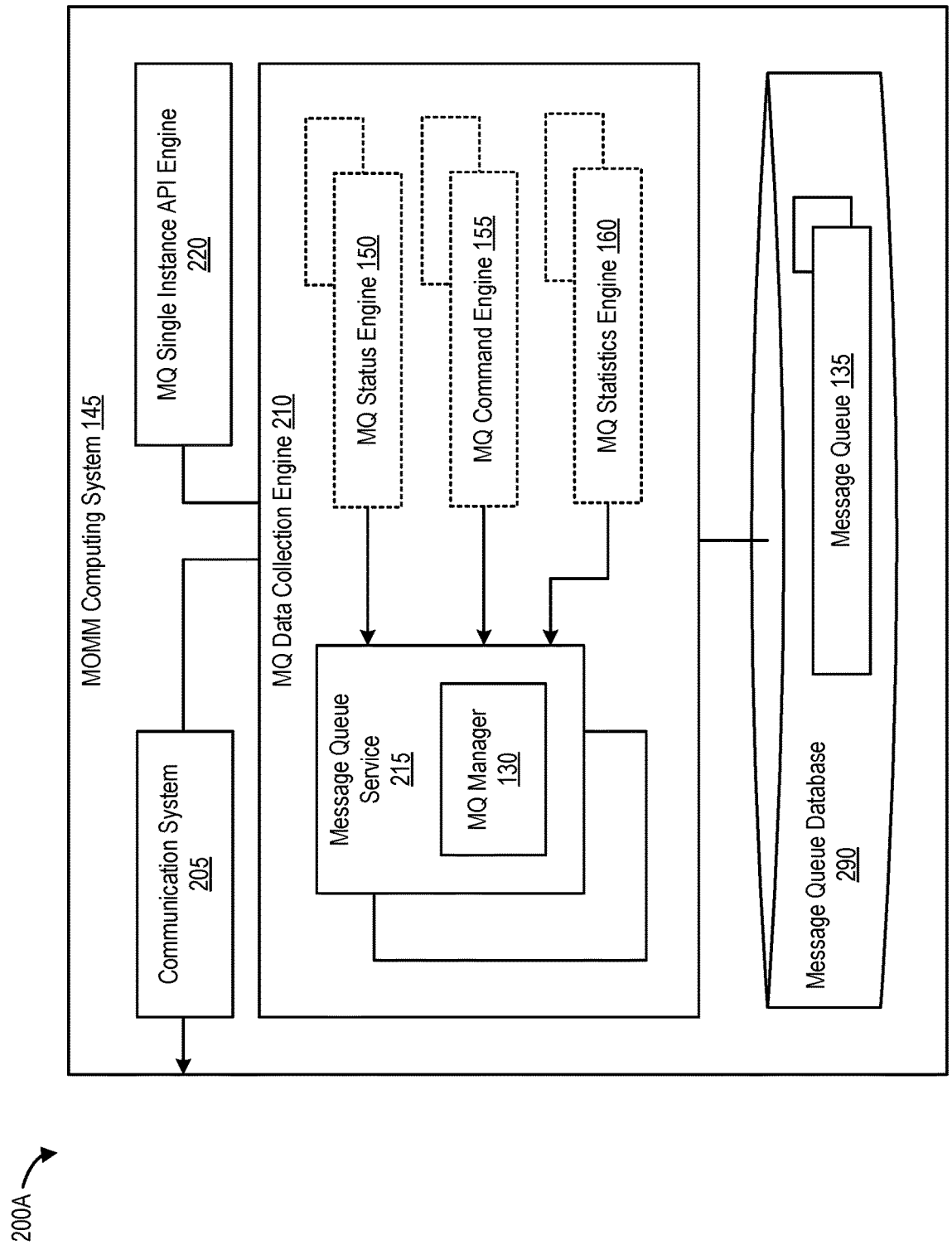
FIG. 2A is a block diagram 200A of a MOMM computing system, according to one embodiment of the present disclosure.

FIG. 2A is a block diagram 200A of a MOMM computing system, according to one embodiment. MOMM computing system 145 includes a communication system 205 (e.g., to communicate with application computing systems via network 140) and provides for a MQ single instance API engine 220. MOMM computing system 145 also implements a MQ data collection engine 210. MQ data collection engine 210 implements a message queue service 215 that implements MQ manager 130. MQ data collection engine 210 also utilizes MQ status engine 150, MQ command engine 155, and MQ statistics engine 160 to collect MQ data held in message queue database 290 (e.g., as part of message queue 135), as well as MQ statistics (from one or more application computing systems). MQ single instance API engine 220 provides a single instance API that can be used by MOMM computing system 145 (or application computing systems) to gather and collect MQ data and MQ statistics data.

In one embodiment, MOMM computing system 145 accesses message queue 135 managed by MQ manager 130 for applications 115(1)-(15) executing on application computing system 165(1). In this example, application computing system 165(1) is part of multiple heterogeneous computing systems (e.g., application computing systems 165(2)-(N)). MQ manager 130, using MQ single instance API engine 220, receives data (e.g., message data) associated with MQ 135 managed by MQ manager 130 for applications 115(1)-(15), and generates (a single) output file that includes the received and/or retrieved data.

In another embodiment, accessing MQ 135, receiving data from MQ database 290, and generating the output file is caused by a single instance API command (e.g., provided by MQ command engine 155) that causes the execution of commands in a set of APIs in an application computing system (e.g., application computing system 165(1)). The role of application computing systems in single instance API-based data collection is now discussed.

Figure 2B:
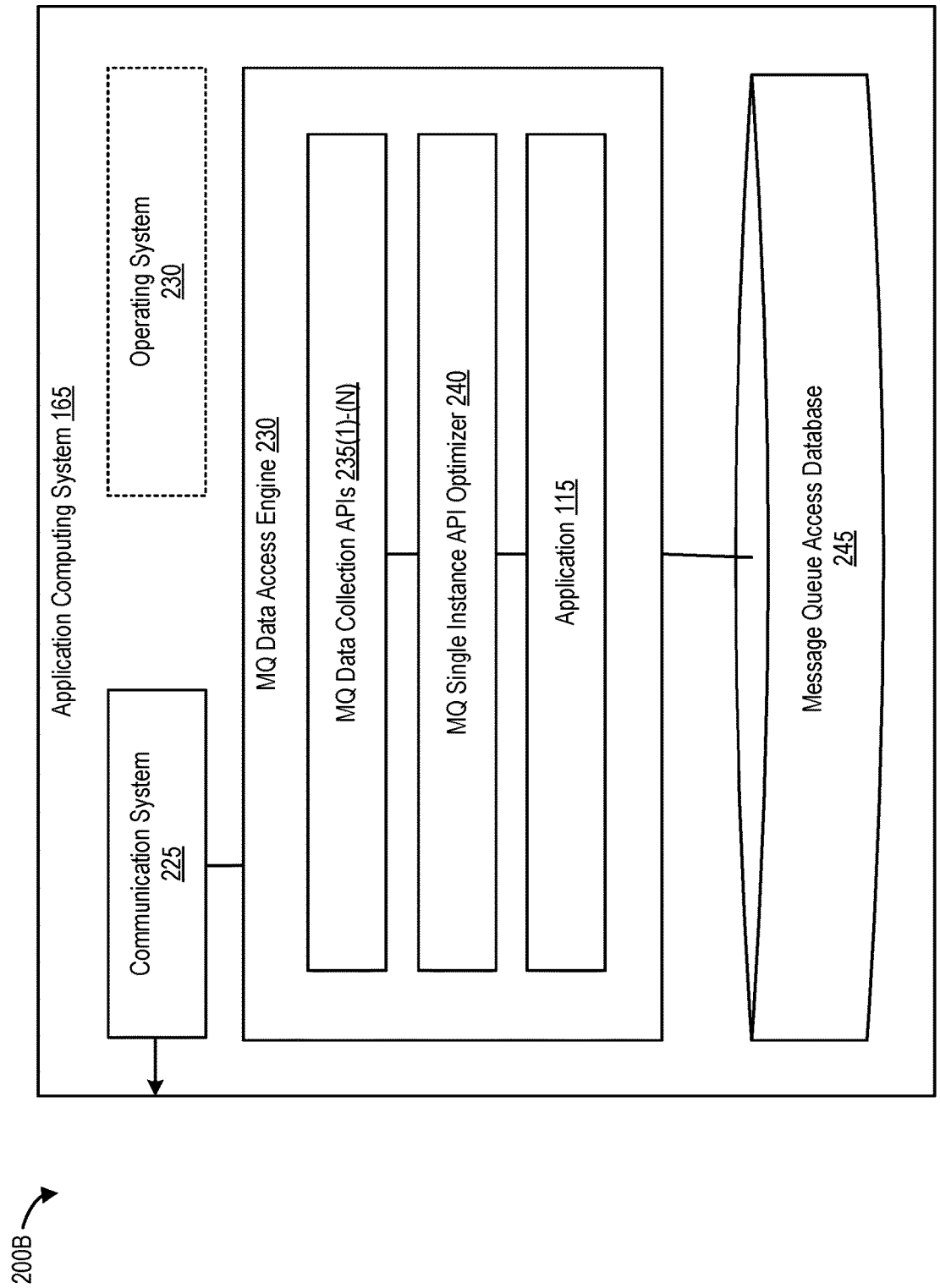
FIG. 2B is a block diagram 200B of an application computing system, according to one embodiment of the present disclosure.

FIG. 2B is a block diagram 200B of an application computing system, according to one embodiment. As shown in FIG. 2B, application computing system 165 includes a communication system 225 (e.g., to communicate with MOMM computing system 145 via network 140), an OS 230, and a MQ data access engine 230. MQ data access engine 230 includes at least MQ data collection APIs 235(1)-(N) (e.g., the set of APIs), a MQ single instance API optimizer 240, and application 115. Application computing system 165 also includes a message queue access database 245 that controls access to one or more MQs.

In some embodiments, MQ service 215 uses MQ single instance API optimizer 240 to implement MQ data collection APIs 235(1)-(N) to generate a single output file by accessing configuration file 185 to identify the root directory of MQ manager 130 (e.g., a root directory of a data object that corresponds to MQ manager 130), accessing the root directory, parsing sibling data objects associated with the MQ manager data object, and storing the data in a multi-dimensional array. Therefore, instead of generating a separate script for each MQ like existing middleware monitoring systems, MQ single instance API optimizer 240 uses MQ data collection APIs 235(1)-(N) provided by MQ single instance API engine 220 to generate a single script to gather and/or retrieve the entire queue manager's queue data in a single output file.

Figure 3A:
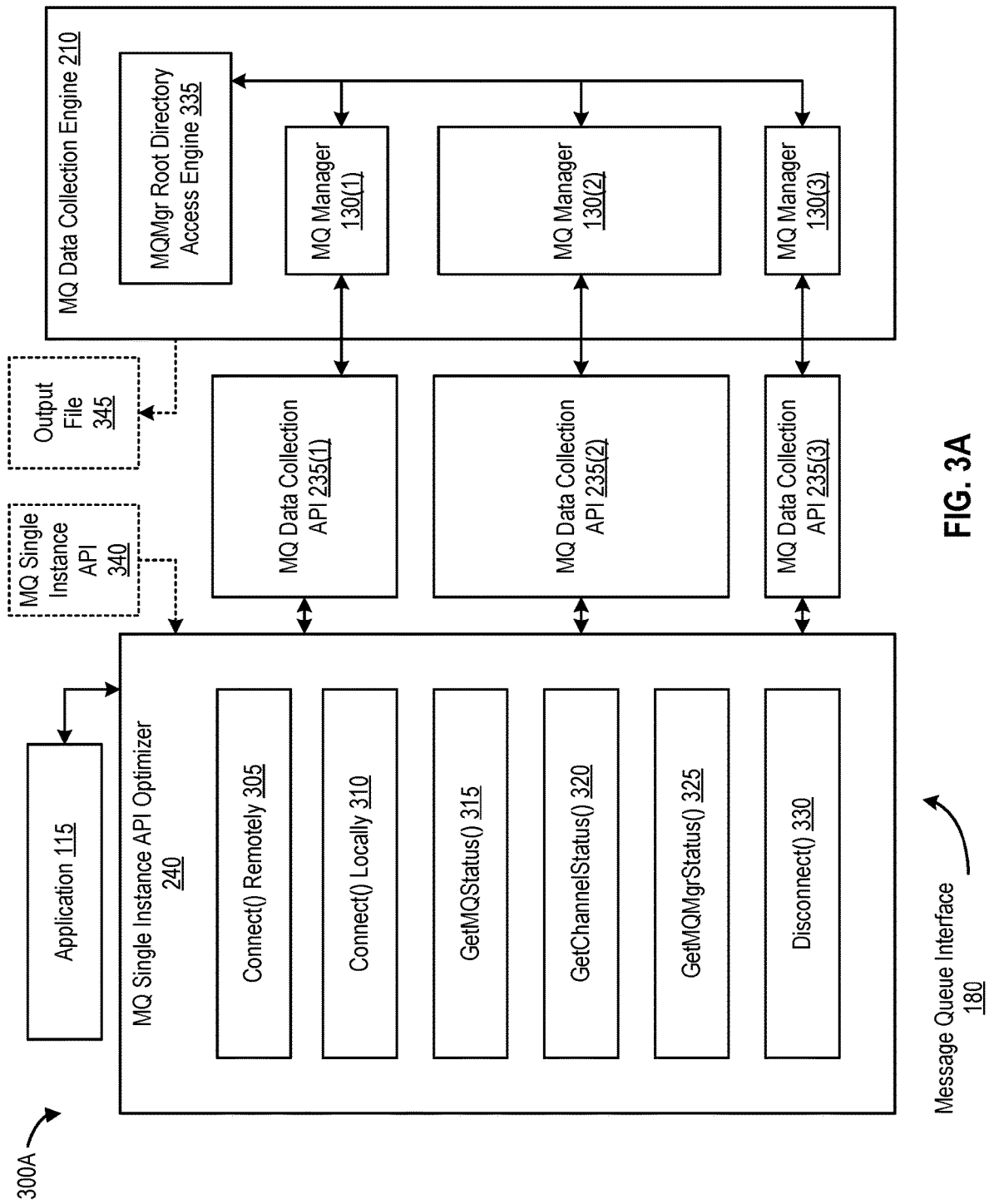
FIG. 3A is a block diagram 300A of a message queue (MQ) single instance application programming interface (API) optimizer and a MQ data collection engine, according to one embodiment of the present disclosure.

Examples of Single Instance API-Based Message Queue Data Collection and Retrieval FIG. 3A is a block diagram 300A of a message queue (MQ) single instance application programming interface (API) optimizer and a MQ data collection engine, according to one embodiment. As shown in FIG. 3A, MQ single instance API optimizer 240 implements a set of APIs (e.g., MQ data collection APIs 235(1)-(N)) to Connect( ) Remotely 305, Connect( ) Locally 310, GetMQStatus( ) 315, GetChannelStatus( ) 320, GetMQMgrStatus( ) 325, and Disconnect( ) 330 using a single instance API (e.g., MQ single instance API 340 provided by MQ single instance API engine 220).

For example, MQ data collection API 235(1) connects remotely and connects locally to the message queue from which data collection is desired. MQ data collection API 325(2) gets and/or retrieves message queue status, channel status, and queue manager status. MQ data collection API 325(3) disconnects from the message queue after retrieving the desired data.

As previously noted, existing middleware monitoring systems and programs perform data collection per queue and are limited to collecting message queue status information. To ameliorate these shortcomings, and in some embodiments, MQ data collection engine 210 permits MQ single instance API optimizer 240 to connect to the root directory (e.g., queue manager 130) using MQMgr root directory access engine 335 and a set of APIs (e.g., MQ data collection Aps 235(1), 235(2), and 235(3)), traverses the tree of the root directory data structure, and parses sibling objects and/or nodes (e.g., MQ managers 130(1), 130(2), and 130(3) as shown in FIG. 3A). For example, data collected from each sibling object (e.g., message queue statistics information from GetMQStatus( ) 315, channel statistics information from GetChannelStatus( ) 320, and queue manager statistics information from GetMQMgrStatus( ) 325) and the root directory itself (e.g., MQ status information) is stored in a multi-dimensional array (e.g., in the form of values) for convenient parsing. MQ data collection engine 210 then generates (a single) output file 345. In this manner, MQ manager 130 permits monitoring of disparate middleware management services implemented by the heterogeneous computing systems using MQ single instance API 340, and (a single) output file 345 is generated in a Comma Separated Values (CSV) file format and/or in a tabular data file format.

The following illustrates an embodiment of implementation code flow for an exemplary MQ manager that is implemented in a heterogeneous MOMM computing environment and uses MQ single instance API 340:

```
//Step1 Connect to MQ Remotely Once
    MQPCF mcPcf = new MQPCF( );
    if (Arrays.asList (args).indexOf("-c")>=0)
        mqPcf.connectToTheQueueManager (qMgr, host, chl, port);
//Step2 Connect to MQ Locally Once
    else
        mcPcf.connecToTheQueueManager (qmgr);
//Step3 Get ALL Queue Status Once
    if(showQs) mcPcf.showQueueStatus(showSystemQueues,
    showAsCsv);
//Step4 Get ALL Channel Status Once
    if(showChs) mcPcf.showChannelStatus(showAsCsv);
//Step5 Get ALL Queue Manager Status Once
    if(showQms) mcPcf.showQmgrStatus(showAsCsv);
//Step6 Disconnect From Queue Manager
    mqPcf.disconnectFromTheQueueManager( );
```

As previously noted, existing middleware monitoring services and queue statistics tools require one script for each MQ, produce a separate file for each MQ, cause high processing and memory utilization, and make multiple API calls for multiple MQs. On the contrary, it will be appreciated that MQ single instance API 340 requires a single script to gather and collect the entire queue manager's data, creates a single output file per queue manager, significantly reduces processing and memory utilization (e.g., because a single instance gathers the required data), and makes only a single API call to gather and collect the required data. For example, in the above example implementation code flow and in reference in FIG. 3A), the MQPCF.java class calls the Queue Statistics, Channel Statistics, and Queue Manager statistics methods once, and then disconnects. It will also be appreciated that in certain embodiments, MQ single instance API 340 can be executed on one or more other disparate computing systems in the same heterogeneous computing environment even though the other disparate computing systems run on different OSs and implement different message brokers (e.g., compared to application computing system 165).

Figure 3B:
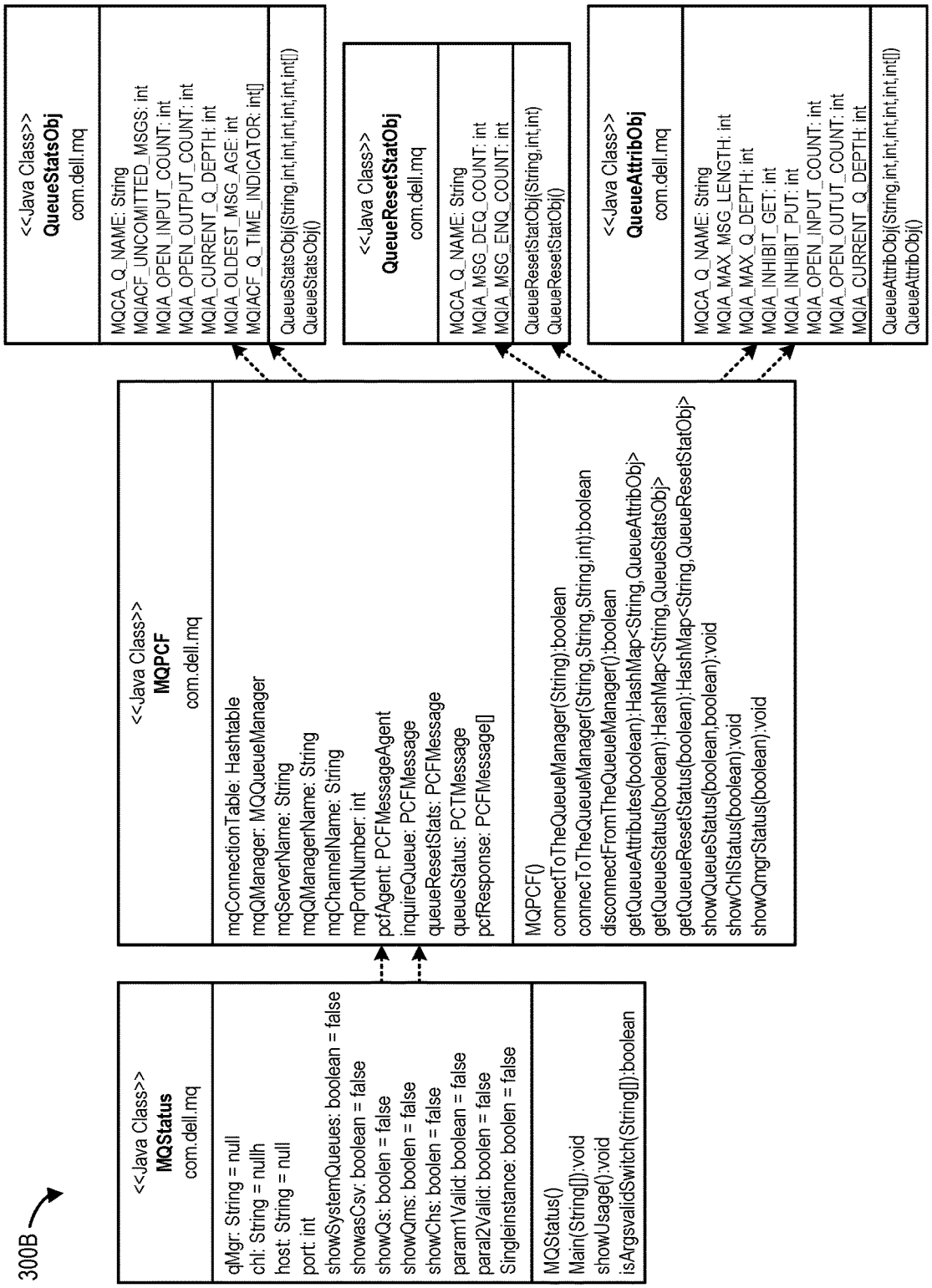
FIG. 3B is a block diagram 300B of a code flow that can be implemented to optimize a MOMM computing system and corresponding application computing systems, according to one embodiment of the present disclosure.

FIG. 3B is a block diagram 300B of a code flow that can be implemented to optimize a MOMM computing system and corresponding application computing systems for middleware monitoring in heterogeneous computing environments, according to one embodiment. The MQPCF.java class and QueueStatsObj.java class may include the following workflow:

```
//MQPCF.java
mgConnectionTable: Hashtable
mqQManager: MQQueueManager
mqServerName: String
mqQManagerName: String
mgChannelName: String
mqPortNumber: int
pcfAgent: PCFMessageAgent
inquireQueue: PCFMessage
queueResetStats: PCFMessage
queueStatus: PCTMessage
pcfResponse: PCFMessage[ ]
//QueueStatsObj.java
MOCA_Q_NAME: String
MQIACF_UNCOMITTED_MSGS: int
MQIA_OPEN_INPUT_COUNT: int
MQIA_OPEN_OUTPUT_COUNT: int
MQIA_CURRENT_Q_DEPTH: int
MQIA_OLDEST_MSG_AGE: int
MQIACF_Q_TIME_INDICATOR: int[ ]
```

Processes for MQ Data Collection in Heterogeneous MOMM Computing Environments

Figure 4:
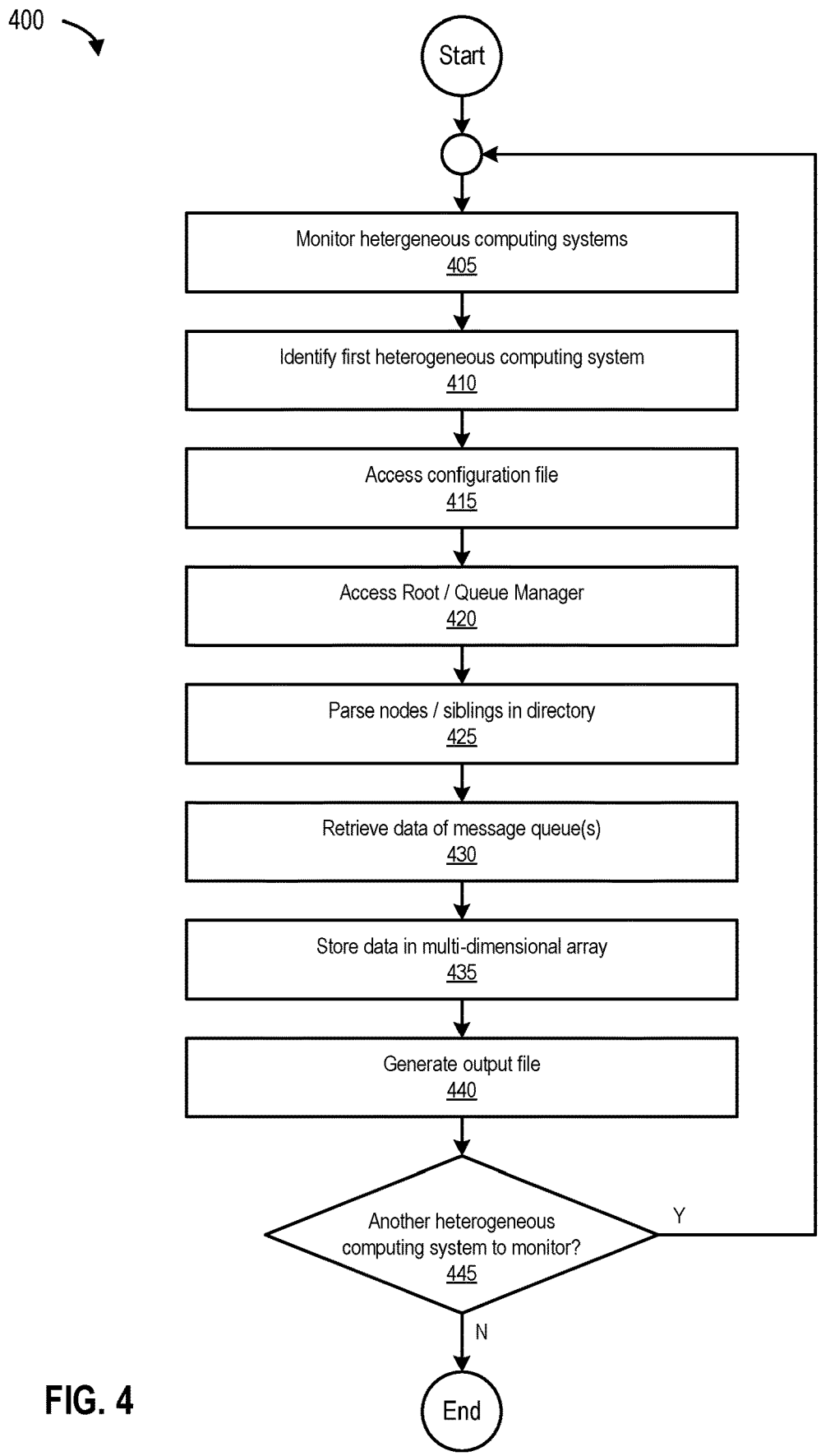
FIG. 4 is a flowchart 400 that illustrates a process for collecting or retrieving middleware data from heterogeneous computing systems using message queues, according to one embodiment of the present disclosure.

FIG. 4 is a flowchart 400 that illustrates a process for collecting or retrieving middleware data from heterogeneous computing systems using message queues, according to one embodiment. The process begins at 410 by identifying a first heterogeneous computing system (e.g., application computing system 165(1)). At 415, the process accesses a configuration file (e.g., configuration file 185). At 420, the process accesses the root/queue manager (e.g., using MQMgr root directory access engine 335 as shown in FIG. 3A). At 425, the process parses nodes/siblings (in the root directory), and at 430, retrieves data of message queue(s). At 435, the process stores the collected and/or retrieved data in a multi-dimensional array, and at 440, generates (a single) output file.

At 445, the process determines if there is another heterogeneous computing system to monitor (e.g., application computing system 165(2)). If there is another heterogeneous computing system to monitor, the process loops to 405. It will be appreciated that MQ single instance API 340 can be executed on the another heterogeneous computing in the same heterogeneous computing environment even though the another heterogeneous computing system runs on a different OS and implement a different message broker (e.g., compared to the first heterogeneous computing system). Otherwise, the process ends.

Figure 5:
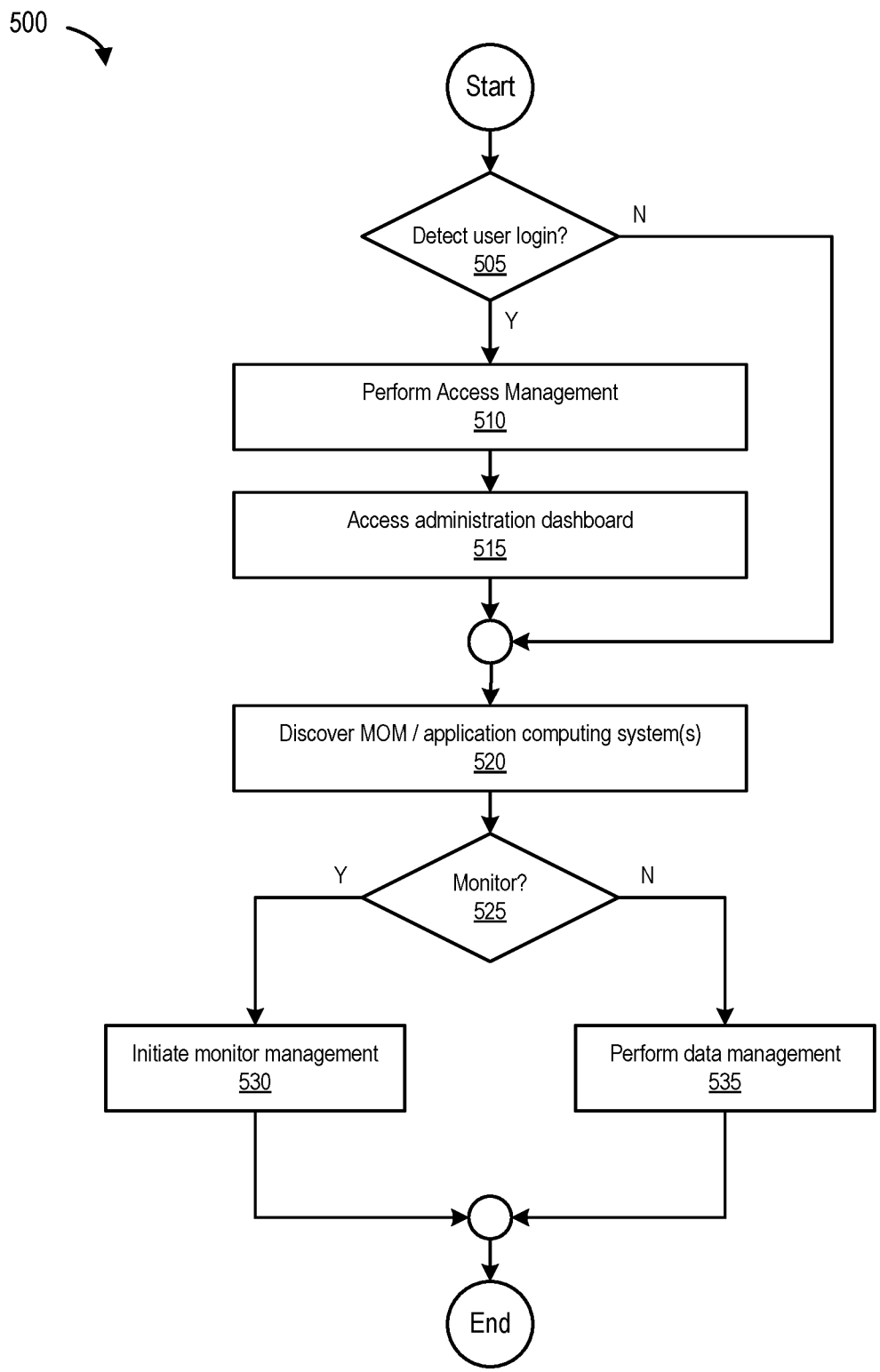
FIG. 5 is a flowchart 500 that illustrates a process for performing middleware monitoring in heterogeneous computing environments, according to one embodiment of the present disclosure.

FIG. 5 is a flowchart 500 that illustrates a process for performing middleware monitoring in heterogeneous computing environments, according to one embodiment. The process begins at 505 by determining if there is a user login. If there is no user login, the process loops to 520 and discovers one or more MOM/application computing systems (e.g., application computing systems 165(1) and/or 165(2)). However, if a user login is detected, the process, at 510, performs access management, and at 515, accesses an administration dashboard (e.g., using message queue interface 180 as shown in FIG. 1B).

At 525, the process determines if the application computing systems should be monitored (e.g., if middleware monitoring data including queue manager statistical data is desired). If the application computing systems should be monitored, the process, at 530, initiates monitor management. However, if the application computing systems need not be monitored, the process, at 535, initiates data management. The process then ends.

Figure 6:
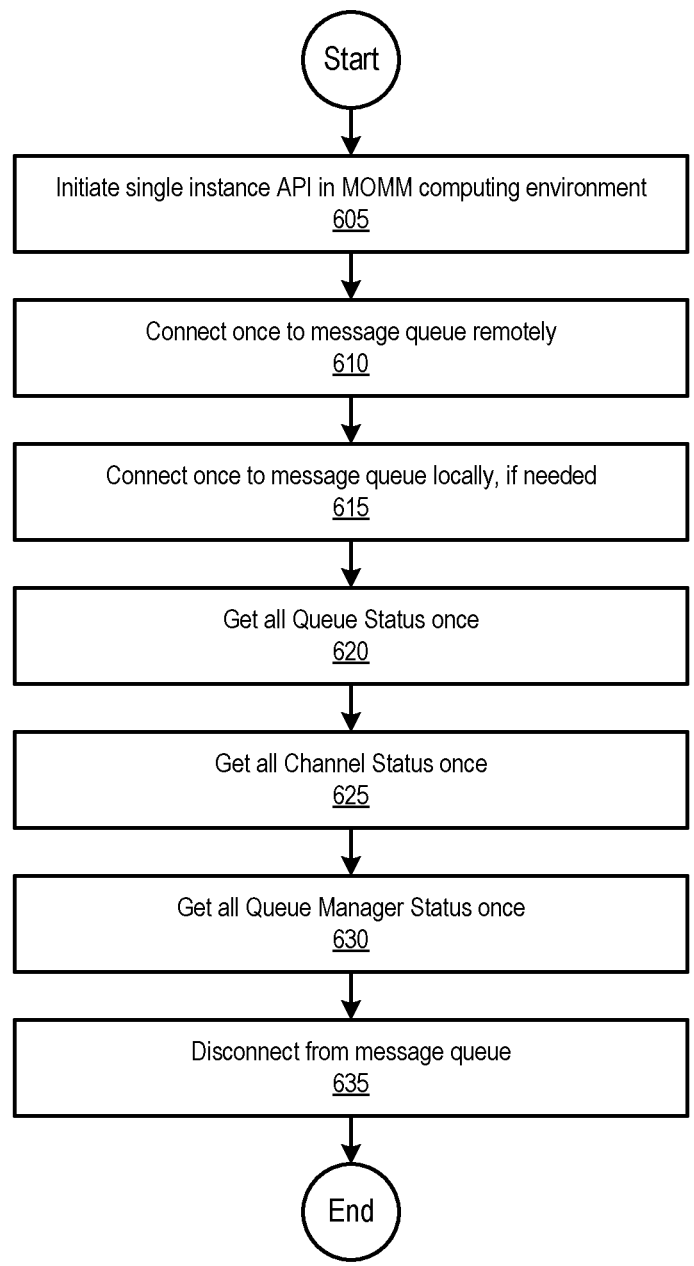
FIG. 6 is a flowchart 600 that illustrates a process for implementing a single instance API in a MOMM computing environment, according to one embodiment of the present disclosure.

FIG. 6 is a flowchart 600 that illustrates a process for implementing a single instance API in a MOMM computing environment, according to one embodiment. The process begins at 605 by initiating a single instance API in a MOMM computing environment (e.g., single instance API 340 provided by MQ single instance API engine 220 as shown in FIGS. 2A and 3A). At 610, the process connects (once) to a message queue remotely (e.g., via MOMM computing system 145) (e.g., MQ 135 as shown in FIG. 1B), and at 615, connects (once) to the message queue locally (e.g., via application computing system 165(1)), if needed (e.g., if application computing system 165(1) is being used in conjunction with MOMM computing system 145 for MQ data collection and/or retrieval).

At 620, the process gets all queue status once (e.g., using GetMQStatus( ) 315). At 625, the process gets all channel status once (e.g., using GetChannelStatus( ) 320). At 630, the process gets all queue manager status once (e.g., using GetMQMgrStatus( ) 325). The process ends at 635 by disconnecting from the message queue.

Figure 7:
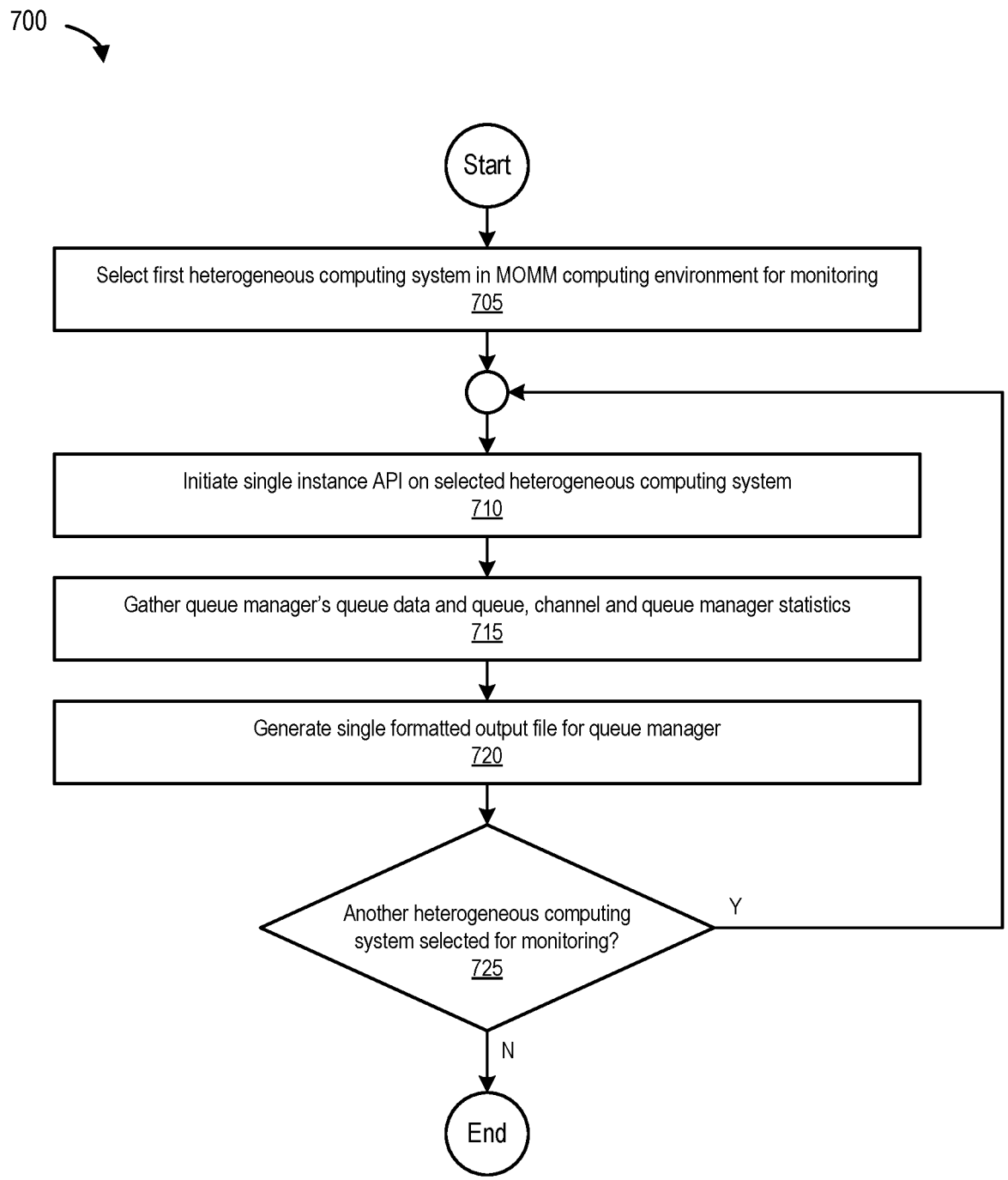
FIG. 7 is a flowchart 700 that illustrates a process for optimizing message oriented middleware monitoring in heterogeneous computing environments, according to one embodiment of the present disclosure.

FIG. 7 is a flowchart 700 that illustrates a process for optimizing message oriented middleware monitoring in heterogeneous computing environments, according to one embodiment. The process begins at 705 by selecting a first heterogeneous computing system in a MOMM computing environment for monitoring (e.g., application computing system 165(1)). At 710, the process initiates a single instance API (e.g., single instance API 340) on the selected heterogeneous computing system. At 715, the process gathers the queue manager's data (e.g., using MQ data collection engine 210), as well as queue, channel, and queue manager statistics (e.g., using MQ statistics engine 160)).

At 720, the process generates a single formatted output file for the queue manager (e.g., output file 345). At 725, the process determines whether another heterogeneous computing system has been selected for monitoring. If another heterogeneous computing system has been selected for monitoring, the process loops to 710. Otherwise, the process ends.

Example Computing Environment

Figure 8:
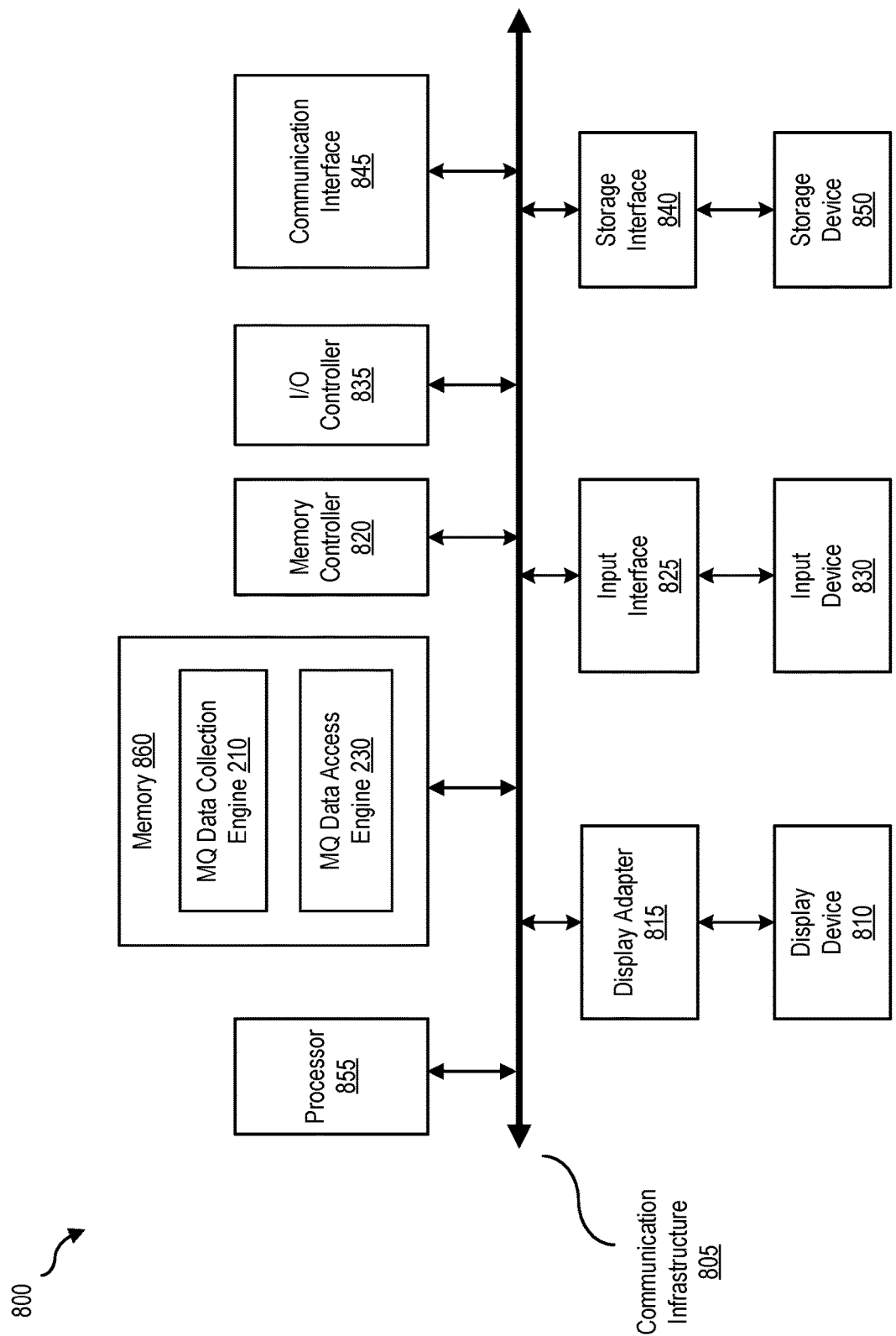
FIG. 8 is a block diagram 800 of a computing system, illustrating how MQ data collection engine and/or a MQ data access engine can be implemented in software, according to one embodiment of the present disclosure.

FIG. 8 is a block diagram 800 of a computing system, illustrating how MQ data collection engine 210 and/or MQ data access engine 230 can be implemented in software, according to one embodiment. Computing system 800 can include MOMM computing system 145 and/or application computing system 165 and broadly represents any single or multi-processor computing device or system capable of executing computer-readable instructions. Examples of computing system 800 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 800 may include at least one processor 855 and a memory 860. By executing the software that executes MQ data collection engine 210 and/or MQ data access engine 230, computing system 800 becomes a special purpose computing device that is configured to optimize message oriented middleware monitoring in heterogeneous computing environments.

Processor 855 generally represents any type or form of processing unit capable of processing data or interpreting and executing instructions. In certain embodiments, processor 855 may receive instructions from a software application or module. These instructions may cause processor 855 to perform the functions of one or more of the embodiments described and/or illustrated herein. For example, processor 855 may perform and/or be a means for performing all or some of the operations described herein. Processor 855 may also perform and/or be a means for performing any other operations, methods, or processes described and/or illustrated herein. Memory 860 generally represents any type or form of volatile or non-volatile storage devices or mediums capable of storing data and/or other computer-readable instructions. Examples include, without limitation, random access memory (RAM), read only memory (ROM), flash memory, or any other suitable memory device. Although not required, in certain embodiments computing system 800 may include both a volatile memory unit and a non-volatile storage device. In one example, program instructions implementing MQ data collection engine 210 and/or MQ data access engine 230 may be loaded into memory 860.

In certain embodiments, computing system 800 may also include one or more components or elements in addition to processor 855 and/or memory 860. For example, as illustrated in FIG. 8, computing system 800 may include a memory controller 820, an Input/Output (I/O) controller 835, and a communication interface 845, each of which may be interconnected via a communication infrastructure 805. Communication infrastructure 805 generally represents any type or form of infrastructure capable of facilitating communication between one or more components of a computing device. Examples of communication infrastructure 805 include, without limitation, a communication bus (such as an Industry Standard Architecture (ISA), Peripheral Component Interconnect (PCI), PCI express (PCIe), or similar bus) and a network.

Memory controller 820 generally represents any type/form of device capable of handling memory or data or controlling communication between one or more components of computing system 800. In certain embodiments memory controller 820 may control communication between processor 855, memory 860, and I/O controller 835 via communication infrastructure 805. In certain embodiments, memory controller 820 may perform and/or be a means for performing, either alone or in combination with other elements, one or more of the operations or features described and/or illustrated herein.

I/O controller 835 generally represents any type or form of module capable of coordinating and/or controlling the input and output functions of an appliance and/or a computing device. For example, in certain embodiments I/O controller 835 may control or facilitate transfer of data between one or more elements of computing system 800, such as processor 855, memory 860, communication interface 845, display adapter 815, input interface 825, and storage interface 840.

Communication interface 845 broadly represents any type or form of communication device or adapter capable of facilitating communication between computing system 800 and one or more other devices. Communication interface 845 may facilitate communication between computing system 800 and a private or public network including additional computing systems. Examples of communication interface 845 include, without limitation, a wired network interface (such as a network interface card), a wireless network interface (such as a wireless network interface card), a modem, and any other suitable interface. Communication interface 845 may provide a direct connection to a remote server via a direct link to a network, such as the Internet, and may also indirectly provide such a connection through, for example, a local area network (e.g., an Ethernet network), a personal area network, a telephone or cable network, a cellular telephone connection, a satellite data connection, or any other suitable connection.

Communication interface 845 may also represent a host adapter configured to facilitate communication between computing system 800 and one or more additional network or storage devices via an external bus or communications channel. Examples of host adapters include, Small Computer System Interface (SCSI) host adapters, Universal Serial Bus (USB) host adapters, Institute of Electrical and Electronics Engineers (IEEE) 1394 host adapters, Serial Advanced Technology Attachment (SATA), Serial Attached SCSI (SAS), and external SATA (eSATA) host adapters, Advanced Technology Attachment (ATA) and Parallel ATA (PATA) host adapters, Fibre Channel interface adapters, Ethernet adapters, or the like. Communication interface 845 may also allow computing system 800 to engage in distributed or remote computing (e.g., by receiving/sending instructions to/from a remote device for execution).

As illustrated in FIG. 8, computing system 800 may also include at least one display device 810 coupled to communication infrastructure 805 via a display adapter 815. Display device 810 generally represents any type or form of device capable of visually displaying information forwarded by display adapter 815. Similarly, display adapter 815 generally represents any type or form of device configured to forward graphics, text, and other data from communication infrastructure 805 (or from a frame buffer, as known in the art) for display on display device 810.

Computing system 800 may also include at least one input device 830 coupled to communication infrastructure 805 via an input interface 825. Input device 830 generally represents any type or form of input device capable of providing input, either computer or human generated, to computing system 800. Examples of input device 830 include a keyboard, a pointing device, a speech recognition device, or any other input device.

Computing system 800 may also include storage device 850 coupled to communication infrastructure 805 via a storage interface 840. Storage device 850 generally represents any type or form of storage devices or mediums capable of storing data and/or other computer-readable instructions. For example, storage device 850 may include a magnetic disk drive (e.g., a so-called hard drive), a floppy disk drive, a magnetic tape drive, an optical disk drive, a flash drive, or the like. Storage interface 840 generally represents any type or form of interface or device for transferring and/or transmitting data between storage device 850, and other components of computing system 800. Storage device 850 may be configured to read from and/or write to a removable storage unit configured to store computer software, data, or other computer-readable information. Examples of suitable removable storage units include a floppy disk, a magnetic tape, an optical disk, a flash memory device, or the like. Storage device 850 may also include other similar structures or devices for allowing computer software, data, or other computer-readable instructions to be loaded into computing system 800. For example, storage device 850 may be configured to read and write software, data, or other computer-readable information. Storage device 850 may also be a part of computing system 800 or may be separate devices accessed through other interface systems.

Many other devices or subsystems may be connected to computing system 800. Conversely, all of the components and devices illustrated in FIG. 8 need not be present to practice the embodiments described and/or illustrated herein. The devices and subsystems referenced above may also be interconnected in different ways from that shown in FIG. 8. Computing system 800 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 800 for storage in memory via a network such as the Internet or upon a carrier medium.

The computer-readable medium containing the computer program may be loaded into computing system 800. All or a portion of the computer program stored on the computer-readable medium may then be stored in memory 860, and/or various portions of MOMM computing system 145 and/or application computing systems 165(1)-(N). When executed by processor 855, a computer program loaded into computing system 800 may cause processor 855 to perform and/or be a means for performing the functions of one or more of the embodiments described/illustrated herein. Additionally or alternatively, one or more of the embodiments described and/or illustrated herein may be implemented in firmware and/or hardware. For example, computing system 800 may be configured as an application specific integrated circuit (ASIC) adapted to implement one or more of the embodiments disclosed herein.

Example Networking Environment

Figure 9:
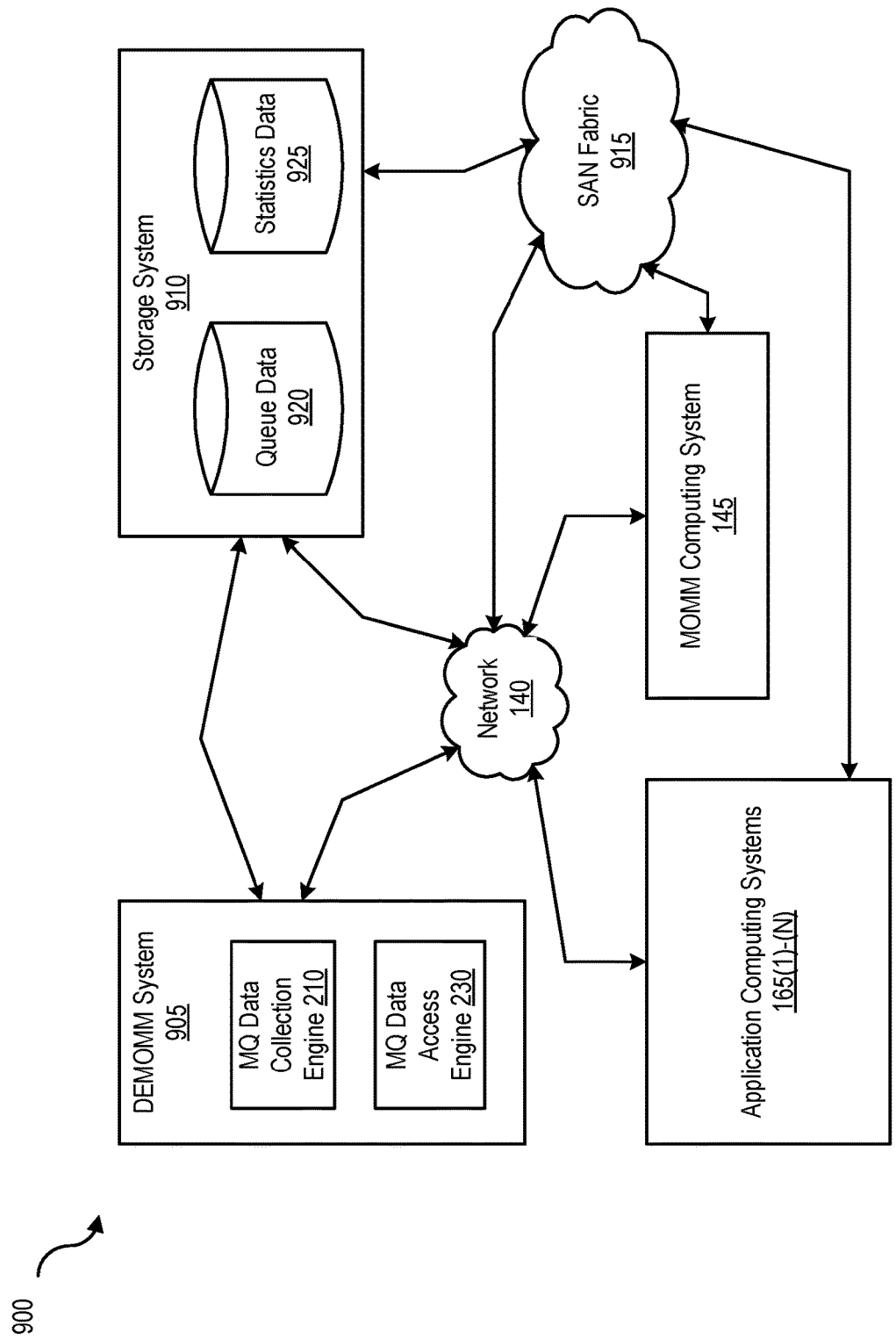
FIG. 9 is a block diagram 900 of a networked system, illustrating how various devices can communicate via a network, according to one embodiment of the present disclosure.

FIG. 9 is a block diagram of a networked system, illustrating how various computing devices can communicate via a network, according to one embodiment. In certain embodiments, network-attached storage (NAS) devices may be configured to communicate with MOMM computing system 145 and/or application computing systems 165(1)-(N) using Network File System (NFS), Server Message Block (SMB), or Common Internet File System (CIFS). Network 140 generally represents any type or form of computer network or architecture capable of facilitating communication between MOMM computing system 145 and/or application computing systems 165(1)-(N).

In certain embodiments, a communication interface, such as communication interface 845 in FIG. 8, may be used to provide connectivity between MOMM computing system 145, application computing systems 165(1)-(N), DEMOMM system 905, and/or any of the computing systems and/or computing devices illustrated in FIGS. 1A-3A, and network 140. The embodiments described and/or illustrated herein are not limited to the Internet or any particular network-based environment.

In some embodiments, network 140 can be a Storage Area Network (SAN). In other embodiments, MQ data collection engine 210 and/or MQ data access engine 230 may be part of MOMM computing system 145, application computing systems 165(1)-(N), and/or DEMOMM system 905, or may be separate. If separate, MOMM computing system 145, application computing systems 165(1)-(N), and/or DEMOMM system 905 may be communicatively coupled via network 140.

In one embodiment, all or a portion of one or more of the disclosed embodiments may be encoded as a computer program and loaded onto and executed by MOMM computing system 145, application computing systems 165(1)-(N), and/or DEMOMM system 905, or any combination thereof. All or a portion of one or more of the embodiments disclosed herein may also be encoded as a computer program, stored on MOMM computing system 145, application computing systems 165(1)-(N), and/or DEMOMM system 905, and distributed over network 140.

In some examples, all or a portion of MOMM computing system 145, application computing systems 165(1)-(N), and/or DEMOMM system 905 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface.

Various functions described herein may be provided through a remote desktop environment or any other cloud-based computing environment. In addition, one or more of the components described herein may transform data, physical devices, and/or representations of physical devices from one form to another. For example, MQ data collection engine 210 and/or MQ data access engine 230 may transform the behavior of MOMM computing system 145, application computing systems 165(1)-(N), and/or DEMOMM system 905 in order to cause MOMM computing system 145, application computing systems 165(1)-(N), and/or DEMOMM system 905 to optimize message oriented middleware monitoring in heterogeneous computing environments.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:

1. A computer-implemented method for optimizing message oriented middleware monitoring, the method comprising:
transmitting a first single instance Application Programming Interface (API) command from a computing device to a first computing system, wherein the first single instance API command executing a message queue single instance Applicant Programming Interface (API) optimizer, wherein the message queue single instance API optimizer implementing a first plurality of APIs to access a first plurality of message queue managers on a message queue data collection engine, wherein the message queue data collection engine permits the message queue single instance API optimizer to connect to a root directory via a root directory access engine and wherein the first plurality of message queue managers managing a first plurality of message queues for a first plurality of applications executing on the first computing system;

receiving in response to the first single instance API command, from the first computing system, a first plurality of performance metrics, wherein a first of the first plurality of performance metrics describes performance of one of the first plurality of message queues for one of the first plurality of applications and wherein the first plurality of performance metrics comprises message queue statistics information accessed via a Message Queue Status API, channel statistics information accessed via a Channel Status API, and queue manager statistics information accessed via a Message Queue Manager Status API; and generating an output file comprising the first plurality of performance metrics associated with the first plurality of message queues.

2. The computer-implemented method of claim 1, wherein generating the output file comprises:

accessing, at the computing device or the first computing system, a configuration file comprising information identifying the root directory of a data object that corresponds to at least one of the first plurality of message queue managers;

accessing the root directory;

parsing a plurality of sibling data objects of the data object;

retrieving the first plurality of performance metrics associated with the first plurality of message queues; and storing the first plurality of performance metrics in a multi-dimensional array.

3. The computer-implemented method of claim 2, wherein the message queue statistics information, the channel statistics information, and the queue manager statistics information comprise middleware monitoring the plurality of performance metrics associated with the plurality of applications; and wherein the middleware monitoring the plurality of performance metrics indicates a value for one or more of the plurality of performance metrics assigned to each message queue of the plurality of message queues.

4. The computer-implemented method of claim 1, further comprising:

transmitting a second single instance Application Programming Interface (API) command from the computing device to a second computing system executing a second plurality of APIs to access a second plurality of message queues for a second plurality of applications executing on the second computing system of the plurality of heterogeneous computing systems;

receiving in response to the second single instance API command, from the second computing system, a second plurality of performance metrics associated with the second plurality of message queues; and wherein the output file further comprises the second plurality of performance metrics associated with the second plurality of message queues.

5. The computer-implemented method of claim 4, wherein the second computing system implements a different operating system and implements a different message oriented middleware management service than the first computing system; and wherein the second computing system is communicatively coupled to the computing device and the first computing system via a network.

6. The computer-implemented method of claim 1, wherein the first plurality of message queue managers monitoring of disparate middleware management services implemented by the plurality of heterogeneous computing systems using the first single instance API; and wherein the output file is generated in a Comma Separated Values (CSV) file format or in a tabular data file format.

7. A non-transitory computer readable storage medium comprising program instructions for optimizing message oriented middleware monitoring and executable to:

transmit a first single instance Application Programming Interface (API) command from a computing device to a first computing system, wherein the first single instance API command executing a message queue single instance Applicant Programming Interface (API) optimizer, wherein the message queue single instance API optimizer implementing a first plurality of APIs to access a first plurality of message queue managers on a message queue data collection engine, wherein the message queue data collection engine permits the message queue single instance API optimizer to connect to a root directory via a root directory access engine and wherein the first plurality of message queue managers managing a first plurality of message queues for a first plurality of applications executing on the first computing system;

wherein the first computing system being part of a plurality of heterogeneous computing systems;

receive in response to the first single instance API command, from the first computing system, a first plurality of performance metrics, wherein the first plurality of performance metrics comprises message queue statistics information accessed via a Message Queue Status API, channel statistics information accessed via a Channel Status API, and queue manager statistics information accessed via a Message Queue Manager Status API and wherein a first of the first plurality of performance metrics describes performance of one of the first plurality of message queues for one of the first plurality of applications; and generate an output file comprising the first plurality of performance metrics associated with the first plurality of message queues.

8. The non-transitory computer readable storage medium of claim 7, wherein generating the output file comprises:

accessing, at the computing device or the first computing system, a configuration file comprising information identifying the root directory of a data object that corresponds to at least one of the first plurality of message queue managers;

accessing the root directory;

parsing a plurality of sibling data objects of the data object;

retrieving the first plurality of performance metrics associated with the first plurality of message queues; and storing the first plurality of performance metrics in a multi-dimensional array.

9. The non-transitory computer readable storage medium of claim 8, wherein the message queue statistics information, the channel statistics information, and the queue manager statistics information comprise middleware monitoring the plurality of performance metrics associated with the plurality of applications; and wherein the middleware monitoring the plurality of performance metrics indicates a value for one or more of the plurality of performance metrics assigned to each message queue of the plurality of message queues.

10. The non-transitory computer readable storage medium of claim 7, further comprising:
transmitting a second single instance Application Programming Interface (API) command from the computing device to a second computing system executing a second plurality of APIs to access a second plurality of message queues for a second plurality of applications executing on the second computing system of the plurality of heterogeneous computing systems;
receiving in response to the second single instance API command, from the second computing system, a second plurality of performance metrics associated with the second plurality of message queues; and
wherein the output file further comprises the second plurality of performance metrics associated with the second plurality of message queues.

11. The non-transitory computer readable storage medium of claim 10, wherein the second computing system implements a different operating system and implements a different message oriented middleware management service than the first computing system; and
wherein the second computing system is communicatively coupled to the computing device and the first computing system via a network.

12. The non-transitory computer readable storage medium of claim 7, wherein the first plurality of message queue managers permit monitoring of disparate middleware management services implemented by the plurality of heterogeneous computing systems using the first single instance API; and
wherein the output file is generated in a Comma Separated Values (CSV) file format or in a tabular data file format.

13. A system for optimizing message oriented middleware monitoring, the system comprising:
one or more processors; and
a memory coupled to the one or more processors, wherein the memory stores program instructions executable by the one or more processors to:
transmit a first single instance Application Programming Interface (API) command from a computing device to a first computing system, wherein the first single instance API command executing a message queue single instance Applicant Programming Interface (API) optimizer, wherein the message queue single instance API optimizer implementing a first plurality of APIs to access a first plurality of message queue managers on a message queue data collection engine, wherein the message queue data collection engine permits the message queue single instance API optimizer to connect to a root directory via a root directory access engine and wherein the first plurality of message queue managers managing a first plurality of message queues for a first plurality of applications executing on the first computing system;
wherein the first computing system being part of a plurality of heterogeneous computing systems;
receive in response to the first single instance API command, from the first computing system, a first plurality of performance metrics, wherein the first plurality of performance metrics comprises message queue statistics information accessed via a Message Queue Status API, channel statistics information accessed via a Channel Status API, and queue manager statistics information accessed via a Message Queue Manager Status API and wherein a first of the first plurality of performance metrics describes performance of one of the first plurality of message queues for one of the first plurality of applications; and
generate an output file comprising the first plurality of performance metrics associated with the first plurality of message queues.

14. The system of claim 13, wherein generating the output file comprises:
accessing, at the computing device or the first computing system, a configuration file comprising information identifying the root directory of a data object that corresponds to at least one of the first plurality of message queue managers;
accessing the root directory; parsing a plurality of sibling data objects of the data object;
retrieving the first plurality of performance metrics associated with the first plurality of message queues; and
storing the first plurality of performance metrics in a multi-dimensional array.

15. The system of claim 14, wherein the message queue statistics information, the channel statistics information, and the queue manager statistics information comprise middleware monitoring the plurality of performance metrics associated with the plurality of applications; and
wherein the middleware monitoring the plurality of performance metrics indicates a value for one or more of the plurality of performance metrics assigned to each message queue of the plurality of message queues.

16. The system of claim 13, further comprising:
transmitting a second single instance Application Programming Interface (API) command from the computing device to a second computing system executing a second plurality of APIs to access a second plurality of message queues for a second plurality of applications executing on the second computing system of the plurality of heterogeneous computing systems;
receiving in response to the second single instance API command, from the second computing system, a second plurality of performance metrics associated with the second plurality of message queues; and
wherein the output file further comprises the second plurality of performance metrics associated with the second plurality of message queues, the second computing system implements a different operating system and implements a different message oriented middleware management service than the first computing system, and wherein the second computing system is communicatively coupled to the computing device and the first computing system via a network.

17. The system of claim 13, wherein the first plurality of message queue managers permit monitoring of disparate middleware management services implemented by the plurality of heterogeneous computing systems using the first single instance API; and
wherein the output file is generated in a Comma Separated Values (CSV) file format or in a tabular data file format.

* * * * *